US008025211B2

(12) United States Patent
Ossandón-Marzolo

(10) Patent No.: US 8,025,211 B2
(45) Date of Patent: Sep. 27, 2011

(54) SYSTEMS AND METHODS OF PRODUCTION, DISTRIBUTION, LOGISTICS, AND PRINTING OF TICKETS

(75) Inventor: Claudio Marcos Ossandón-Marzolo, Santiago (CL)

(73) Assignee: Lotería De Concepción, Santiago (CL)

( * ) Notice: Subject to any disclaimer, the term of this patent is extended or adjusted under 35 U.S.C. 154(b) by 641 days.

(21) Appl. No.: 12/111,411

(22) Filed: Apr. 29, 2008

(65) Prior Publication Data

US 2009/0001155 A1 Jan. 1, 2009

(30) Foreign Application Priority Data

Apr. 30, 2007 (CL) .................................. 1239-2007

(51) Int. Cl.
*G06F 17/00* (2006.01)

(52) U.S. Cl. ....................................................... 235/375

(58) Field of Classification Search ................... 235/375
See application file for complete search history.

(56) References Cited

U.S. PATENT DOCUMENTS

| | | | | |
|---|---|---|---|---|
| 7,695,360 | B2 * | 4/2010 | Breslo | 463/17 |
| 2002/0002916 | A1 * | 1/2002 | Sugiyama | 101/142 |
| 2006/0079311 | A1 * | 4/2006 | Nulph | 463/17 |
| 2006/0223616 | A1 * | 10/2006 | Tulley et al. | 463/17 |

FOREIGN PATENT DOCUMENTS

WO WO 9949418 A1 * 9/1999

* cited by examiner

*Primary Examiner* — Daniel Hess
(74) *Attorney, Agent, or Firm* — Knobbe Martens Olson & Bear, LLP

(57) ABSTRACT

Systems and methods for the production, distribution, logistics and printing of lottery tickets are disclosed. A central server provides a ticket combination and identifying variable data in response to a request from a computing system terminal. The terminal receives combination and variable data and issues commands for the printing of the same on a plurality of tickets. The tickets comprise a substratum capable of being printed upon at high speeds and colors and images. The printing may be performed at a point of sale. Prior to printing, the plurality of tickets may be imprinted with information related to marketing and appearance. Additionally, prior to the printing, the plurality of tickets do not have a combination or identifying variable data serving to identify the plurality of tickets.

22 Claims, 1 Drawing Sheet

SYSTEMS AND METHODS OF PRODUCTION, DISTRIBUTION, LOGISTICS, AND PRINTING OF TICKETS

CROSS-REFERENCE TO RELATED APPLICATIONS

This application claims priority to Chilean Patent Application No. 1239-2007, entitled "Sistema y método de producción, distribución, logística e impresión de boletos para loterías mediante un sistema de impresión para una primera impresión colorida; una pluralidad de boletos hechos de sustrato para la primera impresión y hechos de sustrato para la posterior impresión a alta velocidad de una combinacióy los datos variables que identifican la combinación", filed Apr. 30, 2007, the entirety of which is hereby incorporated by reference.

BACKGROUND OF THE INVENTION

1. Field of the Invention

Embodiments of the present disclosure relate to lotteries and, in particular, to systems and methods for the production, distribution, logistics, and printing of lottery tickets.

2. Description of the Related Art

The sale of games of chance, especially forecast games, are presently conducted in two forms: on line and pre-printed. In the case of on line sales, the customer selects the letters, numbers, or other signs in a combination for a specified drawing. In the case of pre-printed forms, the customer chooses a previously printed ticket, which will be valid for a specified future drawing, and contains a choice of letters, numbers or other signs constituting a pre-established combination.

Even though the sale of pre-printed lottery tickets is effective due to the fact that it is easy and attractive from the customer's point of view, it does bring up problems which result in high production, distribution, logistics and printing costs. At the opposite end, the online modality is effective from the point of view of the administrative entity but sales are more difficult since tickets so produced are not visually attractive to the customer and sales further require premeditated actions which take some of the customer's time.

SUMMARY OF THE INVENTION

Embodiments of the present disclosure provide systems and methods for the production, distribution, logistics and printing of lottery tickets. Beneficially, such systems and methods allow for substantial reductions of production costs and may further reduce distribution logistics and administrative costs which accompany all systems existing to date.

Embodiments of the invention may be applied to games of chance and, in particular, to the production, logistics, and printing of forecast gambling tickets. In certain embodiments, these gambling tickets comprise those where the public chooses letters, numbers or other signs from a finite universe, which may be referred to as a combination, for a future event, which may be referred to as a drawing.

Contrary to the traditional methods, embodiments of the present disclosure have the clear advantages of each one of the traditional systems described above and do not have any of the drawbacks of said systems. These embodiments also have additional advantages comprising:

1) The manager of the point of sales, or the vendor, selects, in a computing system for the on line registration of combinations, a number of tickets to be printed with said computing system for an on line register of combinations. The number of tickets can be equal to 1 or higher, there being no limitation.

2) The computing system terminal requests, from the main or central server of the administrative entity, the authorization to enter a combination and its identifying variable data. The supplied variable data, irrespective of their being eliminated, added, or others be defined and which identify a combination may include:

Drawing number

Drawing day (Monday, Tuesday, Wednesday, Thursday, Friday, Saturday, Sunday)

Date (day, month, year) for the drawing

Ticket number

Combination (a randomly chosen combination of letters, numbers or other signs)

Special indicators for the combination (such as combination alternatives, wilds, etc.)

Bar code shown graphically (for management of stocks and sales)

Bar code in numbers (to complement the graphic bar code when no scanner is available)

Security code (secret identifier to verify whether the ticket is authentic)

Price

3) The terminal receives the combination and its identifying variable data and issues the adequate commands for the printing of same in the printing system specifically implemented for this method.

4) The vendor displays the tickets on the counter for their sale.

5) The customers chooses the ticket and pays for it.

In one embodiment, the system for the production, distribution, logistics and printing of tickets comprises the following:

1. A system for the loading of paper (housing for paper rolls or stacks).
2. Paper simultaneously adequate to the type of printing used in the printing of identical colorful motives and compatible with fast drying inks and the high speed printing of the combination and its identifying variable data at the point of sales by means of an established weight per square meter, adequate thermal sensitivity and with markings to insure accurate cuts. In one embodiment, the weight per square meter is at least 60 grs./$m^2$.
3. Adequate fast drying inks.
4. UV drying system
5. High speed thermal printer
6. Adequate size of roll or paper stack
7. Layout or coverage of specific colors in the printing of identical motives in full color.
8. Total or partial paper cutter to separate the tickets
9. High storage capacity tray for printed tickets
10. Terminal or computing system for the on line registration of combinations, connected to a high speed printing system for the combinations and their identifying variable data at the point of sales.
11. Central server for the administrative entity.
12. Adequate link between said terminal and said central server (with high availability)

The terminal has, in additional embodiments, at least one scanner of forms, a ticket printer for conventional on line modality, a monitor and a keyboard to allow for the scanning of forms with a combination defined by the customer.

DETAILED DESCRIPTION

Figure 1:
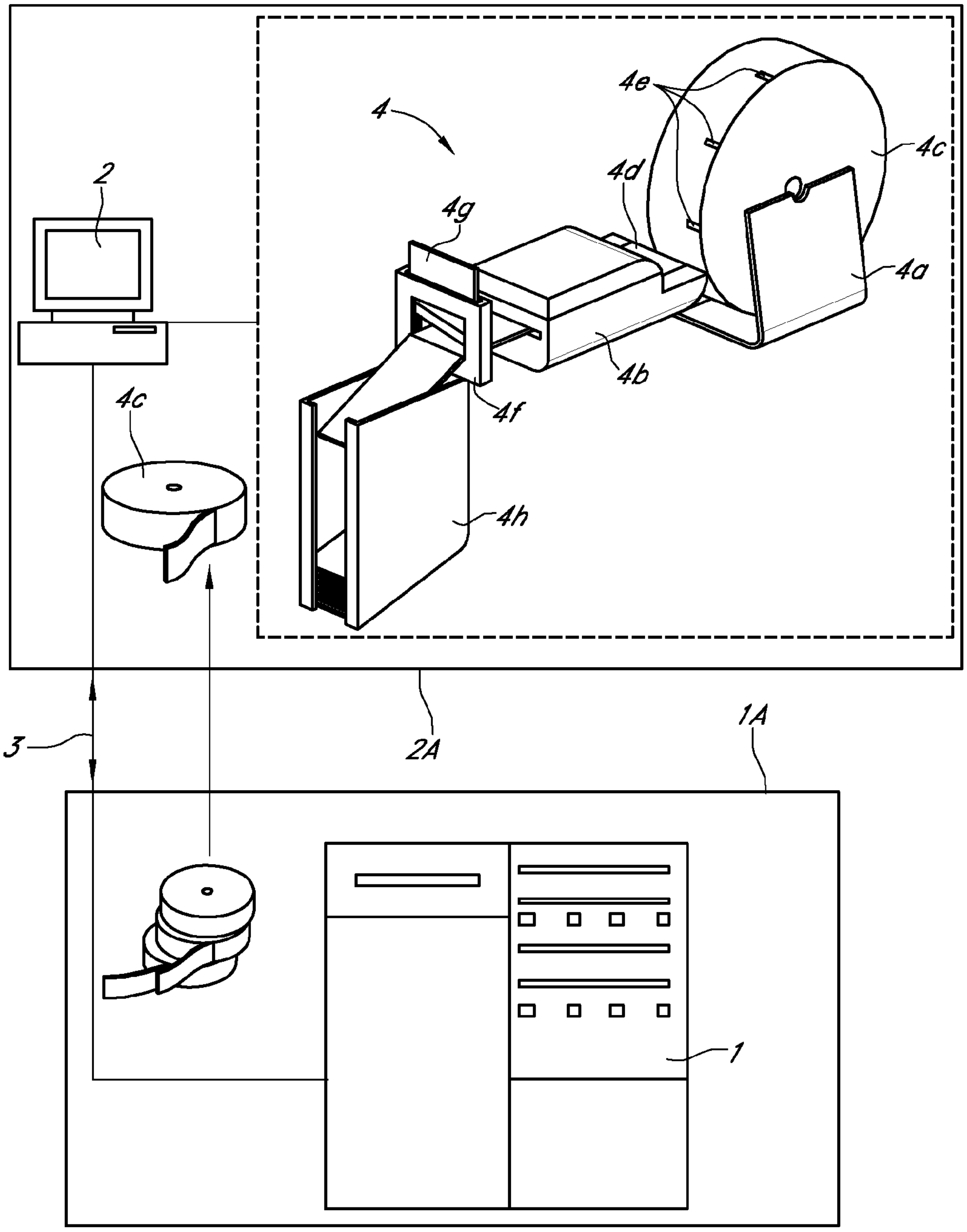
FIG. 1 corresponds to a diagram showing the elements in one embodiment of a system for the production, distribution, logistics and printing of lottery tickets and their physical relationship.

The sale of games of chance, especially forecast games, are presently conducted in two forms: on line and pre-printed.

On Line Modality

The on line mode consists of choosing combination numbers on a form which are then entered into a terminal or computing system for the on line registration of combinations and from where the combination numbers are sent to the servers of the administrative entity of the games of chance, or administrative entity. Once the combination has been authorized and confirmed, said combination is printed on a slip which the vendor delivers to the customer once the price of the ticket or slip has been paid.

Steps to be taken may include:

a) The customer requests a blank ticket at the point of sales in order to fill it in with his preferred numbers;

b) The customer selects the numbers and fills the blanks in the ticket with the numbers he has chosen;

c) The customer turns over to the vendor the ticket with the chosen numbers;

d) The vendor places the ticket in the computer service terminal located at the point of sales for the on line registration of the combination in a central server of the administrative entity;

e) The computer system for on line registration of combinations makes an on line registration of the combination or numbers chosen by the customer in the central server of the administrative entity;

f) The terminal at the point of sales prints, by means of a conventional printer, the numbers selected by the customer on a record thereof, and g) The customer pays and the vendor delivers to him the ticket or record of purchase with the selected numbers printed on it.

The advantages of the on line modality include:

The vendor sells what the customer requests without having a stock of combinations or tickets:

The vendor does not have to keep combinations or tickets of value and therefore does not need to return valued species to the administrative entity before the time of the drawing;

The vendor has no need of inventory control of tickets or internal management of same;

Vendor does not run the risk of theft of tickets since he does not keep valued species, each ticket being a potential winner of valuable prizes;

The vendor and the administrative entity know at any given time how many tickets have been sold and do not have to wait for the time of the drawing to establish how many tickets were sold since there is no need for the return of the unsold tickets or combinations;

There are no administrative costs for the administrative entity nor for the vendor since there is no need for a management system nor for logistics for transport and mail in both the delivery of tickets for a new drawing and for the withdrawal of unsold tickets for the forthcoming drawing;

There is no cost of production for the tickets;

There are no costs for ticket losses since there is no return of such tickets or records of each drawing.

The disadvantages of the on-line modality include:

The tickets or records have little color (colorless), which is fundamental for the impulse buying in the industry of games of chance, which means they have no "label" or packaging to create a difference from other games;

There is no impulsive buying when not seeing the available ticket on the counter;

A form with blank spaces must be filled, an unfriendly process considered to be cumbersome for the customers;

The customer must wait for his combination to be registered in the servers of the administrative entity, which makes for a delay in the purchasing process between the time when he registers his numbers on the ticket until he is given his record sheet.

In matters concerning communication between the central server of the administrative entity and the computing system for the on line record of combinations it is considered that a secure transaction, according to the state of the art, is being conducted in transactions of data bases.

Preprinted Modality

The preprinted modality for sale of games of chance includes having the tickets with the combinations already printed on them and shown in windows or at point of sales counters. As a result, the administrative entity supplies a quota of combinations or tickets to each point of sales through special mailings and other mechanisms for their conveyance. The seller then places the tickets in sight of the customers so they can choose their favorite. Before the end of the day of the drawing the seller collects all unsold tickets and sends them to the administrative entity before the beginning of the drawing, which obviously includes logistic difficulties and the need to overcome geographical difficulties, the first one of them being the distance between the administrative entity and each point of sales and the time needed to cover said distance.

The sales process towards the customer includes:

1. The administrative entity must estimate a quota of tickets for each point of sales and send them a cautiously anticipated number to make their sale possible.
2. The administrator of the point of sales or the vendor receives the tickets that have been assigned or requested and exhibits them on the counter at the point of sale.
3. The customer sees the colored tickets on a counter and chooses one.
4. The seller delivers the ticket to the customer and takes payment.

The advantages of the pre-printed modality are mainly as follows:

The tickets are very colorful, something fundamental to impulsive buying, which means they have a "label" and are so packaged as to make them different from other games.

Purchase comes about in impulsive manner when seeing the ticket on the counter.

There is no need to complete a ticket with unfriendly blanks, something that facilitates the purchasing process.

The customer needs not wait until his combination is recorded by the servers of the administrative entity.

The disadvantages of the pre-printed modality include:

The administrative entity must estimate a quota of tickets to be sent to each point of sales or the manager of the point of sales must request a quota of tickets;

Estimated or requested quotas of tickets in which every ticket is a potential winner must be sent by specialized transport systems;

A permanent stock of plays must be maintained at the point of sales for sale for each drawing;

Valued species with combinations or documents are kept at the point of sales, which entails the risk of burglary, since each ticket is a potential winning ticket;

Unsold combinations must be returned to the administrative entity by means of a specialized system or transport method and with insurance coverage since each ticket is a potential winner;

An inventory control or internal management system is required, since each ticket is a potential winning ticket;

Neither the manager at the point of sales, nor the administrative entity, know on line how many tickets have been sold and have to wait until the day of the drawing to know exactly how many were sold, since there is a requirement for the return of the unsold documents or combinations.

There are high administrative costs for the administrative entity, as the entity maintains complex logistics in the entire country for the withdrawal of unsold combinations before the drawing and the delivery of tickets for the following drawing in the shortest possible time;

There are high costs for the point of sales in the need for having administrative systems for the control and inventory of the existing tickets:

There are high costs for the issuance of tickets. These costs are due to the requirement that the tickets be printed by high speed printing methods and systems suited to the printing of identical motives which must be complemented by costly variable printing methods so that each ticket will carry its own specific combination, generated randomly, plus all the necessary security, identification and authentication elements;

There are also high costs due to the drop in the number of tickets resulting from unsold combinations which, in addition to being returned to the administrative entity must, upon receipt, be carefully inventoried prior to their destruction or total annulment;

The administrative entity must estimate the quota of tickets to be sold at each point of sales.

Research was conducted in different types of systems for the implementation of a method for the production, distribution, logistics, and printing which is configured to provide specific characteristics including, in certain embodiments: a full color printing system, paper, inks used in the printing of a ticket which is as similar as possible to a preprinted, traditional ticket, a printing system for combinations and their identifying variable data at a point of sales with a minimum duration corresponding to the periods of time required in the regulations for the collection of a prize.

The system for the production, distribution, logistics, and printing of preprinted lottery tickets comprises, in certain embodiments, at least one central server for computing systems for the registration of on line combinations (1) belonging to an administrative entity (1*a*); at least one computing system for the registration of online combinations (2) in said central server located at the point of sales (2A); an adequate connection (3) between the central server for computing systems for the registration of on line combinations (1) and the computing system for the registration of on line combinations (2); at least one printing system (4) to print and adequately separate a lottery ticket connected adequately to said at least one computing system for the registration of online combinations (2) where the printing system (4) comprises a loading system (4*a*) for lottery tickets where said tickets have no combination nor the identifying variable data printed thereon and serving to identify it; a high speed ticket printer (4*b*) allowing the printing of the combination and the identifying variable data on a full color lottery ticket; a plurality of lottery tickets (4*c*), where said tickets do not have a printing of the combination nor of the identifying variable data and are produced on a substratum (4*d*) adequate to the printing of identical motives at high speeds and unlimited capacity for colors and images; and said plurality of lottery tickets are made simultaneously on an adequate substratum (4*d*) for subsequent high speed printing of the combination and the identifying variable data, where said high speed printing is generated by orders from the computing system for the on line registration of on line combinations (2); said plurality of lottery tickets comprises markings (4*e*) identifying the beginning and the end of each lottery ticket; said printing system (4) has a system for the scanning and detection of the markings (4*f*) which identify the beginning and end of a lottery ticket within said plurality of lottery tickets; a system for the separation of lottery tickets (4*g*) to separate a ticket from said plurality of lottery tickets once identification has been made of the markings which define the beginning and end of a ticket and, finally, the printing system (4) has a system for the reception of preprinted lottery tickets (4*h*) which have been separated to avoid their falling away and preventing damage or losses.

Listed below are the results of the research directed at obtaining success for the method of production, distribution, logistics and printing of the tickets, in certain embodiments.

A loading system (4*a*) with enough capacity for containing a plurality of lottery tickets (4*c*) with no printed combination. In one embodiment, the plurality of lottery tickets comprises a continuous roll of paper of at least about 90 millimeters in diameter. In further embodiments, the plurality of lottery tickets comprises a continuous roll of paper having at least 900 tickets. In further embodiments, the plurality of lottery tickets comprises a folded stack of continuous paper. In additional embodiments, the folded stack of paper comprises at least 900 tickets. Beneficially, this configuration allows the generation of about 900 combinations daily.

A system for the recognition of the black precision markings (4*f*) for the separation or cutting of the ticket.

A system for the separation of lottery tickets (4*g*) with capacity for operating a partial cut and a complete cut of the ticket from a plurality of lottery tickets (4*c*).

A high speed printing system (4*b*) corresponding to a thermal type of printing with a printing speed of less than 3.9 seconds per ticket for the high speed printing of a combination and its identifying variable data as measured in a volume printing of 50 tickets. This requisite is due to a commercial need to make printing at the point of sales feasible.

A system for the reception of preprinted lottery tickets (4*h*) which contains tickets printed by the high speed printing system (4*b*) in the case of volume printing. Beneficially, this reception system makes it possible to print, for instance, 50 tickets and store these preprinted tickets in the system for the reception of lottery preprinted tickets so they cannot fall, be lost, or damaged.

Adequate substratum (4*d*) corresponding to adequate continuous thermal paper supplied in rolls or stacks suited to the possibility of being completely covered by the printing of identical high velocity motives with an unlimited capacity for colors and motives corresponding to a ticket which separates the multiple identical motives or tickets carrying black printed markings on the obverse side of the paper, which must be detected by the printing system (4).

Adequate substratum (4*d*) corresponding to thermal paper of at least 90 grams/$m^2$, in one embodiment, for a correct high velocity printing of a combination and its variable identifying data over the inks which could completely cover said thermal paper.

The level of sensitivity to the thermal paper, in one embodiment, may be of average type to ensure high velocity printing of a combination and its identifying variable data over the inks and an adequate duration of said high velocity printing of a combination and its variable identifying data in support of the period of time of the validity of the ticket.

To insure the quality of the high velocity printing of a combination and its identifying variable data over the high velocity printing of identical motives with unlimited capacity for color and motives, in one embodiment, said printing may have layout or coverage of between 70% and 90% in the case of yellows and a smaller percentage in the case of dark colors. Absent this, the high velocity printing of a combination and its identifying variable data may appear in gray and the information may stay less time printed on the ticket. In other words, a direct correlation was found between the color and the duration of the high velocity printing of a combination and its identifying data, on the ticket.

The layout or complete coverage of 100% may also affect the high velocity printing of a combination and its identifying variable data to the extent of approximately 1 second when printing 50 consecutive tickets. During the development of embodiments of the disclosure, it was possible to determine the presence of a correlation between the layout or printing coverage of high velocity identical motives with an unlimited ability for colors and motives and the printing velocity of a combination and the identifying variable data.

Another problem which has been detected and solved with the described chosen parameters, was as follows. When conducting the printing of identical motives at high velocity with an unlimited capacity for colors and motives corresponding to a ticket, the ink in said tickets printed in traditional conditions permeated the paper, soiling the entire roll or stack. This demanded multiple tests with different types of drying and detecting instant drying paints to allow rolling or stacking after the printing. In certain embodiments, a drying process of less than 0.001 second for the printing of identical high velocity motives with an unlimited capacity for colors and motives may be employed. Finally, the inks used in the printing of identical motives at high velocities with unlimited capacity for colors and motives may be, in certain embodiments, of the type used in offset printing with Ultra Violet, or UV, drying.

The method used in this invention, in certain embodiments, comprises the use of the printing system described above and may comprise the following steps:

a) The administrative entity prepares a plurality of tickets on which are printed information related to the marketing and appearance and not with a printed combination, nor the identifying variable data. These tickets are kept in rolls or stacks.

b) The administrative entity sends to the point of sales said plurality of tickets without a printed combination. This shipment is free of risks of theft, since the tickets do not carry a valid combination.

c) The administrator or vendor at the point of sales places such plurality of tickets in the loading system of the printing system.

d) A specific number of tickets to be printed by the agent or vendor at the point of sales is selected. The agent or vendor can request the printing of an arbitrary number of tickets and even turn out each ticket at the request, and in the presence of, the customer, maintaining a minimum adequate stock of tickets which are potential winning tickets.

e) Input of said specific and arbitrary number of tickets to be printed into at least one computing system for on line registration of combinations.

f) Request from the computing system for on line registration of combinations with the central server of the administrative entity for authorization to register a combination.

g) Random generation of a combination for each ticket in said central server of the administrative entity.

h) Assignment of the variable data which identifies it in said central server of the administrative entity.

i) Remittance of the combination and the identifying variable data from said central server of the administrative entity to the computing system for the on line registration of combinations.

j) Reception, in the computing systems for on line registration of combinations, of the combination and identifying variable data.

k) Issuance of suitable orders to the printing system for the printing of the combination and the variable data identifying each ticket.

l) Accumulation of preprinted validated tickets and separated in the system for reception of tickets.

m) The vendor places the preprinted tickets carrying the printed combination and identifying variable data on the sales counter.

n) The customer selects the preprinted ticket and pays for it.

The point of sales concept may be taken in its most general sense, including from a traditional point of sales such as store, a street stand, or a bookstore, to its concept as an automatic sales machine where the vendor's operations are automated and the operations of the administrative entity are conducted remotely.

It may also be stressed that this system can also be used for sales in an on line modality when inserting the form in the computing system's terminal for the on line registration of combinations in a central server of the administrative entity and using the above described method, this being an alternative modality which encompasses the following steps, in certain embodiments:

a) The administrative entity prepares a plurality of tickets without a printed combination.

b) The administrative entity sends said plurality of tickets without a printed combination to the point of sales.

c) The administrative entity or the vendor at the point of sales input said plurality of tickets to the loading system of the printing system.

d) The customer selects a combination.

e) The customer inputs a selected combination on a form supplied at the point of sales.

f) Input of the form into a computing system for on line registration of combinations.

g) Request from the computing service for the on line registration of on line combinations to the central server of the administrative entity for an authorization to send a combination.

h) Assignment of variable data identifying the combination in said central server of the administrative entity.

i) Remittance of the combination and the variable identifying data from said central server of the administrative entity to the computing system for the on line registration of combinations.

j) Reception, at the computing system for the on line registration of combinations of the combination and its identifying data.

k) Generation of the adequate orders to the printing system to print the combination and the identifying variable data for each ticket.

l) Reception of the preprinted ticket, validated and separated from the ticket reception system.

m) Delivery of the ticket preprinted with the combination and the identifying variable data to the customer.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A system for the production, distribution, logistics and printing of preprinted tickets for lotteries which comprises:

a) a lottery ticket loading system configured to receive lottery tickets carry printed information related to marketing and appearance and no printing of a combination, understood as a choice of letters, numbers or other signs, nor the identifying variable data for said combination;

b) a high velocity ticket printing system permitting the printing of the combination and its identifying variable data on said lottery tickets;

c) a first plurality of lottery tickets wherein said tickets carry printed information related to marketing and appearance and no printing of the combination and its identifying variable data and are produced on a substratum adequate for the high velocity printing of identical motives with an unlimited capacity for colors and layouts and denominated first printing, wherein the first printing is conducted on an offset printer;

d) a second plurality of lottery tickets produced from the first plurality of lottery tickets by high velocity printing of a combination and the identifying variable data using the printing system, denominated second printing, wherein said second printing is generated by commands from a computing system for the on line registration of combinations, wherein the second printing is conducted with a thermal type ticket printing system;

e) said first and second plurality of lottery tickets comprising marks which identify the beginning and end of each preprinted lottery ticket;

f) an acknowledgement system for the markings which identify the beginning and end of a lottery ticket within said first and second plurality of lottery tickets;

g) a system for the separation of lottery tickets for the separation of a ticket from said first and second plurality of lottery tickets once identification is made of the markings which define the beginning and end of each ticket; and h) a system for the reception of preprinted lottery tickets which have been separated;

wherein the adequate substratum corresponds to paper, cardboard or a similar product adequate for the offset printing and for the subsequent thermal type printing.

2. System for the production, distribution, logistics and printing of preprinted lottery tickets in accordance with claim 1, wherein the markings correspond to a specific substantially similar geometrical figure, of a substantially identical color, placed in substantially the same place so that it can be detected by an adequate sensor.

3. System for the production, distribution, logistics and printing of preprinted lottery tickets in accordance with claim 1, wherein the first plurality of lottery tickets without the printing of a combination nor the identifying variable data correspond to a continuous paper roll.

4. System for the production, distribution, logistics and printing of preprinted lottery tickets in accordance with claim 3, wherein the separation system for the lottery tickets for the separation of each ticket corresponds to a paper cutter which performs the cutting of a ticket according to the markings.

5. System for the production, distribution, logistics and printing of preprinted lottery tickets in accordance with claim 4, wherein the paper cutter cuts a ticket totally or partially according to the markings.

6. System for the production, distribution, logistics and printing of preprinted lottery tickets in accordance with claim 3, wherein the first plurality of lottery tickets that do not carry a combination not the variable identifying data corresponds to a continuous roll of paper of at least 90 millimeters in diameter.

7. System for the production, distribution, logistics and printing of preprinted lottery tickets in accordance with claim 3, wherein the first plurality of lottery tickets that do not carry a combination not the variable identifying data corresponds to a continuous roll of paper containing at least 900 tickets.

8. System for the production, distribution, logistics and printing of preprinted lottery tickets in accordance with claim 1, wherein the first plurality of lottery tickets, without the printing of a combination or its identifying variable data, corresponds to an adequately folded stack of continuous paper.

9. System for the production, distribution, logistics and printing of preprinted lottery tickets in accordance with claim 8, wherein the stack of continuous adequately folded stack of paper without the printing of a combination not the identifying data contains at least 900 tickets.

10. System for the production, distribution, logistics and printing of preprinted lottery tickets in accordance with claim 8, wherein the separation system for the lottery tickets for the separation of each ticket corresponds to a paper cutter which performs the cutting of a ticket according to the markings.

11. System for the production, distribution, logistics and printing of preprinted lottery tickets in accordance with claim 1, wherein the adequate paper is at least 60 grs./$m^2$ in weight.

12. System for the production, distribution, logistics and printing of preprinted lottery tickets in accordance with claim 1, wherein the adequate paper comprises thermal paper.

13. System for the production, distribution, logistics and printing of preprinted lottery tickets in accordance with claim 1, wherein the printing with an offset type printer is conducted using fast drying inks.

14. System for the production, distribution, logistics and printing of preprinted lottery tickets in accordance with claim 13, wherein the printing in an offset type printer is conducted using fast drying inks, photo curable with ultraviolet light.

15. System for the production distribution, logistics and printing of preprinted lottery tickets in accordance with claim 13, wherein the printing with an offset type printer is performing using a selected layout or coverage percentage between 70% and 90% for the color yellow.

16. System for the production, distribution, logistics and printing of preprinted lottery tickets in accordance with claim 15, wherein the printing with an offset type printer is performed using a layout or percentage of coverage under the selected layout or coverage percentage for colors other than yellow.

17. System for the production, distribution, logistics and printing of preprinted lottery tickets in accordance with claim 1, wherein the printing system of thermal type tickets prints tickets in approximately 3.8 seconds or less per ticket when printing a series of 50 tickets.

18. System for the production, distribution, logistics and printing of preprinted lottery tickets in accordance with claim 1, comprising:

a) preparing a plurality of tickets on which the first printing has been conducted, without a combination nor the variable data identifying each printed ticket by an administrative entity;

b) sending said plurality of tickets on which the first printing has been performed to the point of sales;

c) placing said plurality of tickets on which the first printing has been performed on the loading system of the printing system at the point of sales;

d) selecting of a specified number of tickets to be printed at the point of sales;

e) inputting of number of tickets to be printed to at least one computer system for the on line registration of combinations;

f) request from the computer system for the registration of on line combinations to the central server of the administrative entity, for authorization to create a combination;

g) creating a combination for each ticket in said central server of the administrative entity;

h) assigning variable data associated to the combination in said central server of the administrative entity;

i) remitting the combination and the identifying variable data from said central server of the administrative entity to the computer system for on line registration of combinations;

j) receiving the combination and its identifying variable data in the computing system for the on line registration of combinations;

k) generating commands to the printing system for the printing of the combination and the identifying variable data which identifies each ticket;

l) storing validated preprinted and validated tickets in the ticket reception system.

19. A method for the production, distribution, logistics and printing of preprinted tickets for lotteries, comprising a) preparing, by an administrative entity, a first plurality of tickets on which is printed information related to marketing and appearance and without a combination or its identifying variable data;

b) sending, by the administrative entity, said plurality of tickets to a point of sale;

c) placing said plurality of tickets on the loading system of a printing system;

d) allowing a customer to select a combination which is entered in a computing system for the on line registration of combinations for a reading of the combination;

f) sending a request from the computer system for on line registration of combinations to the central server of the administrative entity for authorization to send the combination;

g) assigning variable data associated to the combination in said central server of the administrative entity:

h) remitting the combination and identifying variable data from said central server of the administrative authority to the computer system for the on line registration of combinations;

i) receiving the combination and identifying variable data at the computing system for on line registration of combinations and identifying variable data;

j) generating commands to the printing system to print the combination and the identifying variable data of each ticket on respective ones of the first plurality of tickets.

20. The method for the production, distribution, logistics and printing of preprinted lottery tickets of claim 19 wherein the step of preparing a plurality of printed tickets without a printed combination comprises the step of placing the printed tickets as a roll.

21. The method for the production, distribution, logistics and printing of preprinted lottery tickets of claim 19 wherein the step of preparing a plurality of printed tickets without a printed combination comprises the step of placing the printed tickets as a stack.

22. The method for the production, distribution, logistics and printing of preprinted lottery tickets of claim 19, wherein the printing system comprises:

a) a loading system configured to receive a continuous length of paper having marks which identify the beginning and end of a ticket;

b) a high velocity ticket printing system permitting the printing of the combination and its identifying variable data on a ticket:

c) an acknowledgement system which identifies the beginning and end of a ticket within the continuous length of paper;

g) a system for the separation of tickets which separates a ticket from the continuous length of paper by identifying the marks which define the beginning and end of each ticket; and h) a system for the reception of tickets which have been separated.

* * * * *